US005635998A

United States Patent [19]
Baugh

[11] Patent Number: 5,635,998
[45] Date of Patent: Jun. 3, 1997

[54] TRANSLATING MULTIFOCAL CONTACT LENS

[76] Inventor: Thomas K. Baugh, 307 W. Main St., Denison, Tex. 75020

[21] Appl. No.: 349,935

[22] Filed: Dec. 6, 1994

[51] Int. Cl.$^6$ ........................................ G02C 7/04
[52] U.S. Cl. ............................. 351/161; 351/160 H
[58] Field of Search .................... 351/161, 160 R, 351/160 H

[56] References Cited

U.S. PATENT DOCUMENTS

| | | | |
|---|---|---|---|
| 3,227,507 | 1/1966 | Feinbloom | 351/160 R |
| 3,431,327 | 3/1969 | Tsuetaki | 351/161 |
| 4,199,231 | 4/1980 | Evans | 351/160 H |
| 5,151,723 | 9/1992 | Tajiri | 351/161 |
| 5,173,723 | 12/1992 | Volk | 351/161 |

FOREIGN PATENT DOCUMENTS

| | | | |
|---|---|---|---|
| 895334 | 5/1962 | United Kingdom | 351/161 |

OTHER PUBLICATIONS

Mandell, Robert B; *Contact Lens Practice–Hard and Flexible Lenses;* Second Edition; 1974; pp. 213–214, 662–664, 388–389 and 584.

Akiyama K; "The General Study of Rectangular Bifocal Contact Lenses"; *Contacto;* Oct. 1960; vol. 4 No. 10 pp. 461–467.

Green, M; "preliminary Report of a New Bifocal Contact Lens"; *Contacto;* Mar. 1961; vol. 5 No. 3 pp. 83–89.

*Primary Examiner*—Georgia Y. Epps
*Assistant Examiner*—Jordan M. Schwartz
*Attorney, Agent, or Firm*—Jerry C. Ray

[57] ABSTRACT

A multifocal contact lens is made of hard or soft lens material in an ellipsoidal shape with a base-down prismatic cross section. Lens geometry improves translation characteristics and maintains rotational stability of the lens. Near- and distance-correcting zones of the lens are separated by an arcuate junction which is convex upward.

4 Claims, 1 Drawing Sheet

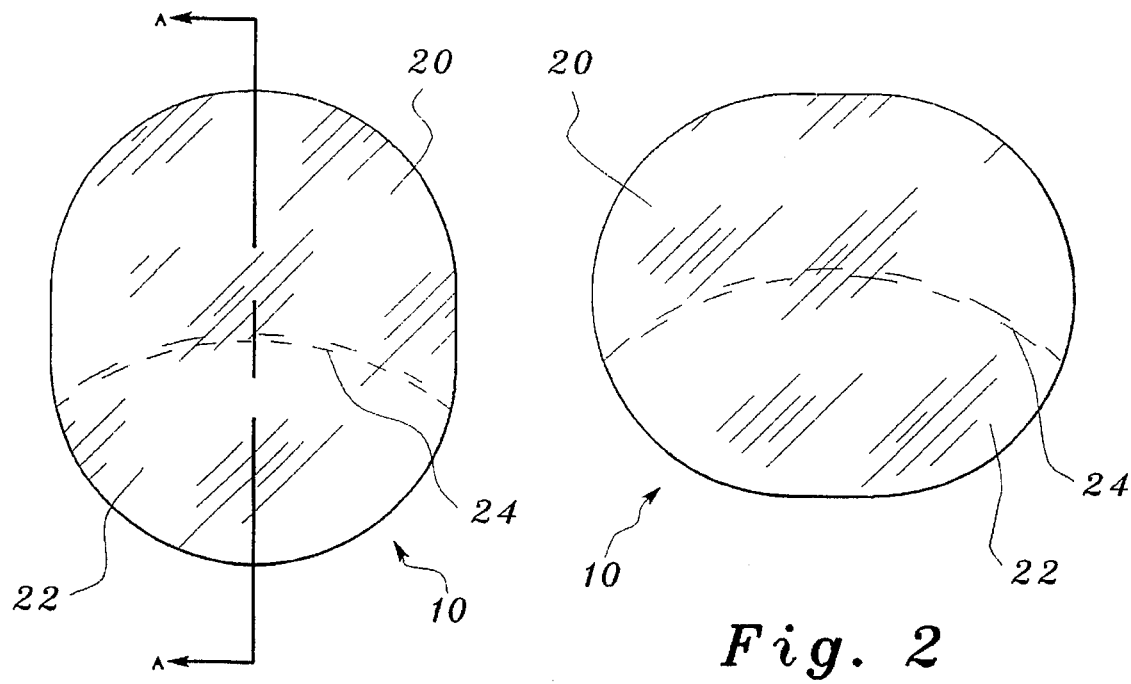
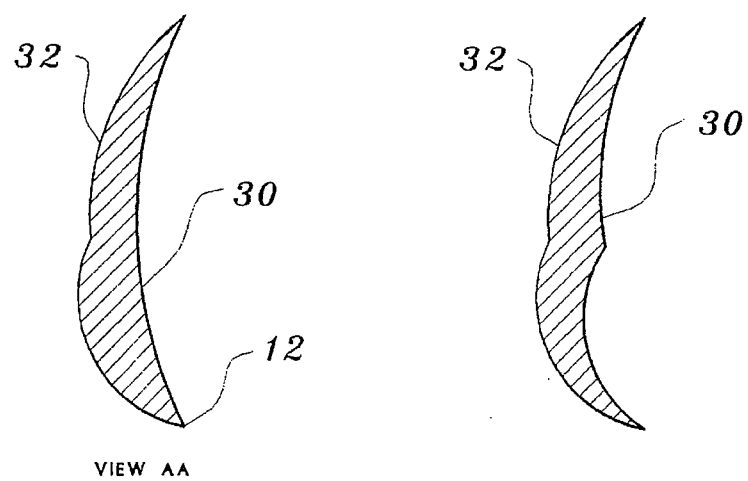
Fig. 1  Fig. 2
Fig. 3  Fig. 4

TRANSLATING MULTIFOCAL CONTACT LENS

BACKGROUND OF THE INVENTION

1. Field of the Invention

This invention relates to contact lenses, and more specifically to multi-focal contact lenses having an ellipsoid shape and improved translation control.

2. Description of the Related Art

Numerous versions of hard and soft, single-focus and multifocal contact lenses are available today. Multifocal lenses may have sharply defined transitions between the corrective elements, or may have a more gradual transition zone. Baron et al. disclose a lens having a vertical transition zone. Multifocal lenses are generally kept in proper rotational orientation on the eyeball by ballasting the lower part of the lens, by using thin zones beneath the eyelids, or by the overall geometry of the lens. Jacobstein, e.g., discloses a ballasted lens having a pressure-releasing vent.

No contact lens which is commercially available or disclosed in any of the patents known to Applicant includes a truncated ellipsoid shape to provide improved translational characteristics together with an arcuate junction between vision correcting components.

Applicant is aware of the following U.S. patents, disclosed by a pre-examination search:

| U.S. Pat. No. | Issue Date | Patentee |
| --- | --- | --- |
| 3,031,927 | May 1, 1962 | Wesley |
| 3,037,425 | Jun. 5, 1962 | De Carle |
| 3,279,878 | Oct. 18, 1966 | Long |
| 4,549,794 | Oct. 29, 1985 | Losbaek, et al. |
| 4,573,775 | Mar 4, 1986 | Bayshore |
| 4,618,227 | Oct. 21, 1986 | Bayshore |
| 4,618,228 | Oct. 21, 1986 | Baron, et al. |
| 4,618,229 | Oct. 21, 1986 | Jacobstein, et al. |
| 4,693,572 | Sep. 15, 1987 | Tsuetaki, et al. |
| 4,728,182 | Mar. 1, 1988 | Kelman |
| 4,938,583 | Jul. 3, 1990 | Miller |
| 5,071,244 | Dec. 10, 1991 | Ross |
| 5,141,301 | Aug. 25, 1992 | Morstad |
| 5,173,723 | Dec. 22, 1992 | Volk |
| 5,245,366 | Sep. 14, 1993 | Svochak |
| 5,245,367 | Sep. 14, 1993 | Miller, et al. |

SUMMARY OF THE INVENTION

Progressive Contribution to the Art

Improved translation characteristics and rotational stability of a multifocal contact lens are achieved through an improved, downward-thickened bicentric lens design having an ellipsoidal shape and a prismatic cross section i.e., the entire lens is prismatic in cross section. The present configuration provides vision correction zones separated by a junction or blend zone which is arcuate rather than straight; the arcuate junction is convex-upward. Curvature of the junction allows a more efficient configuration of the correction zones and also allows a practitioner to readily determine the rotational position of the lens on the eye. Additional reference markings may also be applied to the lenses to aid in measurement of lens rotation on the eye.

OBJECTS OF THIS INVENTION

It is an object of this invention to provide a bifocal or multi-focal contact lens with improved vertical translation characteristics.

It is another object to provide a bifocal contact lens with improved rotational stability.

Another object is to provide a bifocal contact lens that can provide spherical and/or astigmatic correction.

Still another object is to use the prism jump that is common to bicentric lens designs.

Further objects are to achieve the above with devices that are compact, durable, lightweight, simple, safe, efficient, and reliable, yet inexpensive and easy to manufacture and install.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 1 is an elevation of the lens with the ellipsoid shape in vertical orientation.

FIG. 2 is an elevation of the lens with the ellipsoid shape in horizontal orientation.

FIG. 3 is a cross section A—A of FIG. 1, showing a simple posterior apical curve.

FIG. 4 is a cross section A—A of FIG. 1, illustrating a compound posterior apical curve.

CATALOG OF THE ELEMENTS

As an aid in correlating the elements of the invention to the exemplary drawings, the following catalog of the elements is provided:

- 10 ellipsoidal lens
- 12 basal portion of prism
- 20 distance correcting zone
- 22 near correcting zone
- 24 arcuate junction
- 30 posterior surface
- 32 anterior surface

DESCRIPTION OF THE PREFERRED EMBODIMENTS

Referring to FIGS. 1 and 2, the ellipsoidal shape of the lens 10 is a departure from the usual circular shape for contact lenses. The shape of the lens is that of an ellipse having an arcuate truncation at each end. As described below, the ellipsoidal shape results in improved translation of the lens and improved rotational stability.

The long axis of the ellipsoidal lens 10 may be oriented vertically as shown in FIG. 1. In another embodiment, illustrated in FIG. 2, the lens 10 is oriented with the long axis of the lens substantially horizontal.

Because the lens is a bicentric or multicentric design, near- and distance-correcting zones of the lens have different foci, or optical centers. The optical centers are aligned vertically when the lens is in position on the user's eye, or in the alternative may be aligned/naso-vertically. A naso-vertical orientation of the optical centers means that the focus of the lowermost vision correcting zone will not be located directly below the focus of the upper vision correcting zone, but instead is somewhat displaced toward the nose of the user to accommodate the convergent motion of the eyeballs as vision shifts from distance to near.

Changes from distance to near vision are generally accompanied by convergent and downward shifts in the position of the eyeball of the lens wearer. As the eyeball shifts position, the lens 10 must translate on the eyeball, allowing the lines of sight to pass into the near correcting zone 22 of the lens. When a person's vision shifts from across the room to a newspaper in his hands, the lines of sight will move across the junction 24 or blend zone separating the correcting zones of the lens. Because reading or near vision is more often focused on an object directly in front of the face than distance vision, the shape and height of the junction or blend zone becomes important. The lens described herein is suitable for correction of astigmatism and presbyopia in the human eye.

An arcuate, convex-upward junction 24 between the correcting zones 20 and 22 improves lens efficiency by restricting the near correction zone 22 to an area directly in front of the wearer. That is, the near zone 22 is smaller in area, and the distance zone 20 is larger, than with a junction or blend zone that forms a straight line. In addition, an ophthalmologist or other practitioner can more readily determine the rotational position of the lens by examining the position of the arcuate junction 24.

FIGS. 3 and 4 illustrate cross sections of the lens along view A—A of FIG. 1. The posterior curve may have a single radius, as shown in FIG. 3, or multiple radii as in FIG. 4. In either embodiment, the thicker basal portion 12 of the lens is in a downward orientation. Resting on the upper edge of the lower eyelid or between the upper edge of the lower eyelid and the eyeball, the basal portion 12 of the lens 10 is important in maintaining translational and rotational stability of the lens. The ellipsoid shape of the lens disclosed herein allows a longer portion of the lens basal edge to rest against the eyelid, resulting in improved rotational stability. Thus, a zone of contact between the basal portion of the lens and the lower eyelid is lengthened by the ellipsoidal shape of the lens as compared to a more nearly circular lens shape.

The lens has two or more vision correcting components or zones. As with most other bifocal or multifocal contact lenses, the distance vision correction zone 20 is located above the near vision correction zone 22 of the lens. Separating the distance zone 20 and the near zone 22 is a junction 24. This junction may be a sharply defined delineation between the correction zones, or it may be a gradual transition between the optical characteristics of each correction zone. In the latter case, junction 24 becomes a blend zone between the correction zones.

In each embodiment, the lens has a chamfered or tapered edge. The chamfer produces a lens edge thickness that may range from 0.01 mm to 0.50 mm.

Currently, materials are available for either hard or soft contact lenses. Designed primarily for soft lenses, the ellipsoidal lens design may also be used in a hard-lens application. It is anticipated that new lens materials will blend the properties of hard- and soft-lens materials, resulting in a continuum of lens characteristics rather than the limited number of choices available today.

Because the distance between the lower eyelid and the bottom of the cornea varies in human eyes, lenses which rest against the lower eyelid, or beneath the edge of the eyelid, must be sized to fit a variety of eyes. The height of the lower correcting zone, measured from the bottom of the pupil, is important to ensure proper fit for a variety of eye sizes.

Depending on the particular person being fitted, the top of the lower correcting zone, which corresponds with junction 24, may be slightly below, aligned with, or slightly above the center of the pupil. It is contemplated that the present invention will be manufactured with the junction at varying heights, in steps of 1 mm to 2 mm, to avoid having lenses made specifically for each wearer.

Manufacture of the lens is by molding, lathing, spin-casting, or a combination of these techniques, all of which are known to those skilled in the art of making contact lenses. The lens disclosed herein may be made by molding to form the curvature in both anterior and posterior surfaces. Alternatively, the anterior surface 32 may be made by casting, and the posterior surface 30 formed by lathing and polishing.

The embodiments shown and described above are only exemplary. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. An improved multi-focal contact lens for correcting astigmatism and presbyopia in a human eye, comprising:

a) said lens having an ellipsoidal shape, b) a long axis of said ellipsoidal shape being horizontal, c) said lens having a cross section in the shape of a prism, with d) a base portion of said prism being in a downward position when the lens is in place on a human eye, so that said base portion rests on a lower eyelid, e) said ellipsoidal shape and said base portion of said prism in combination producing an elongated zone of contact between said base portion of the prism and the lower eyelid, f) two or more vision-correcting zones each having an optical center, g) an arcuate junction between said vision-correcting zones, said junction being convex upward, and h) a chamfered edge.

2. The invention as described in claim 1, wherein:

i) said arcuate junction provides a marker for determining a rotational position of said lens on an eyeball.

3. The invention as described in claim 1, wherein:

j) said ellipsoidal shape of said lens is an ellipse having an arcuate truncation of both ends of a long axis of the ellipse.

4. The invention as described in claim 1, wherein:

k) said lens is stabilized as to rotational and translational motion on an eyeball by said elongated zone of contact between said base portion of the prism and the lower eyelid.

* * * * *